United States Patent [19]

Andress et al.

[11] Patent Number: 5,472,379
[45] Date of Patent: Dec. 5, 1995

[54] AIR FILTER FOR THE INTERIOR OF MOTOR VEHICLES

[75] Inventors: Heinz Andress, Erdmannhausen; Arthur Klotz, Remseck; Christof Mangold, Stuttgart; Hermann Maurer, Oberstenfeld, all of Germany

[73] Assignee: Filterwerk Mann & Hummel GmbH, Ludwigsburg, Germany

[21] Appl. No.: 228,354

[22] Filed: Apr. 15, 1994

[30] Foreign Application Priority Data

Apr. 16, 1993 [DE] Germany .......... 93 05 767.9

[51] Int. Cl.⁶ .................................................. B60H 3/06
[52] U.S. Cl. ............................ 454/158; 55/493; 55/502; 55/507
[58] Field of Search .................... 55/385.2, 385.3, 55/493, 497, 502, 505, 507; 454/158

[56] References Cited

U.S. PATENT DOCUMENTS

| | | | |
|---|---|---|---|
| 2,513,716 | 7/1950 | Farr | 55/493 X |
| 2,761,291 | 9/1956 | Gulding | 454/158 |
| 3,648,381 | 3/1972 | Fox | 55/507 X |
| 3,712,033 | 1/1973 | Gronholz | 55/500 X |
| 4,002,443 | 1/1977 | Lorenz . | |
| 4,242,951 | 1/1981 | Bemiss | 454/158 X |
| 5,256,103 | 10/1993 | Abthoff et al. | 454/139 |
| 5,273,487 | 12/1993 | Dauvergne | 454/158 |
| 5,273,563 | 12/1993 | Pascal et al. | 55/493 |

FOREIGN PATENT DOCUMENTS

| | | |
|---|---|---|
| 549474 | 6/1993 | European Pat. Off. . |
| 2306357 | 10/1976 | France . |
| 2586203 | 2/1987 | France . |
| 8808009.9 | 9/1988 | Germany . |
| 3731620 | 3/1989 | Germany . |
| 4140965 | 6/1993 | Germany . |
| 4205836 | 7/1993 | Germany . |
| 56-124420 | 9/1981 | Japan . |
| 2264443 | 9/1993 | United Kingdom . |

*Primary Examiner*—Harold Joyce
*Attorney, Agent, or Firm*—Evenson, McKeown, Edwards & Lenahan

[57] ABSTRACT

An air filter includes a housing having an air inlet and an air outlet. A filter element is insertable into the housing. The filter element includes a filter medium folded in an accordion-like manner, as well as a surrounding seal for sealing off a pure-air area. The air inlet of the housing has the same cross-section as that of the filter element. Holders are arranged on the housing via film hinges. The holders operate to fix the filter element in an installed position in the housing.

9 Claims, 2 Drawing Sheets

AIR FILTER FOR THE INTERIOR OF MOTOR VEHICLES

BACKGROUND OF THE INVENTION

This invention relates to a filter and, more particularly, to an air filter for the interior of motor vehicles.

From German Patent document DE-PS 40 28 899, an air filter for motor vehicles is known having a holding device and a removable cover part. A filter element is arranged between the holding device and the cover part. The holding device is provided with plug-type connections. The cover part is inserted into the plug-type connections. At the same time, the filter element is clamped between the two parts via sealing surfaces arranged on the holding device and the cover part. The plug-type connection is an elastically deformable element which causes a non-positive connection between the holding device and the cover part.

A disadvantage of this known device is that, for example, the cover part may detach from the holding device as a result of vibrations. The filter housing may therefore open up in an unintended manner.

Furthermore, from German Patent document DE-GM 87 09 100, a filter device is known in which a filter element is provided with brackets on its circumference. These brackets are clamped into a connecting point between the filter cover and the filter bottom. The brackets are provided with suitable sealing devices such that a seal between the housing bottom and the housing cover is achieved at the same time the brackets are clamped.

It is a disadvantage of the device known from German Patent document DE-GM 8709100 that the two housing parts must be screwed together.

SUMMARY OF THE INVENTION

The present invention is based on the object of avoiding the above-mentioned disadvantages while providing an air filter wherein the filter element is easy to exchange and the filter housing can be manufactured at low cost.

An air filter includes a housing having an air inlet and an air outlet. The air filter includes a filter element insertable into the housing. The filter element includes a filter medium folded in an accordion-like manner, as well as a surrounding seal for sealing off a pure-air area. The air inlet of the housing has a cross-section corresponding with that of the filter element. Holders are arranged on the housing via film hinges. The holders operating to fix the filter element in an installed position in the housing.

A particular advantage of the present invention is its simple construction. The invention no longer requires a housing cover. Further, the unfiltered air inlet corresponds in size to the cross-section of the filter element. This leads to simple requirements with respect to the mounting of the filter. Also, the unfiltered air can flow into the filter element in an unhindered and unobstructed manner.

Because the present invention eliminates the filter cover, an expedient fastening of the filter element is therefore naturally required. This is achieved in that holders are fastened, via film hinges, directly to the housing. The holders fix the filter insert in the installed position.

According to a further embodiment of the invention, the housing is manufactured of a thermoplastic material. The holders, with their film hinges, can be cast directly with the housing. Thus, the housing, including the fastening elements, consists of a single part, whereby considerable mounting and manufacturing costs are saved.

According to a further advantageous embodiment, the holder is provided with at least one rib. In the case of an installed filter element, this rib exercises a force on the filter element to ensure a secure fastening in the housing.

According to a still further embodiment, the filter element is made of a paper or nonwoven material which is folded in an accordion-like manner. The filter element is provided with a surrounding PUR-foam (polyurethane resin foam) on a polyester base sealing. The construction of the filter element, in which no metallic parts are used, is therefore designed to be disposal-friendly, i.e., the filter element can be thermally disposed of without any problems.

These and other characteristics of preferred further embodiments of the invention are found in the specification and the drawings. It is to be understood that the individual characteristics may be implemented separately or combined, and may represent advantageous as well as separately patentable constructions.

Other objects, advantages and novel features of the present invention will become apparent from the following detailed description of the invention when considered in conjunction with the accompanying drawings.

BRIEF DESCRIPTION OF THE PREFERRED EMBODIMENTS

DETAILED DESCRIPTION OF THE PREFERRED EMBODIMENTS

Figure 1:
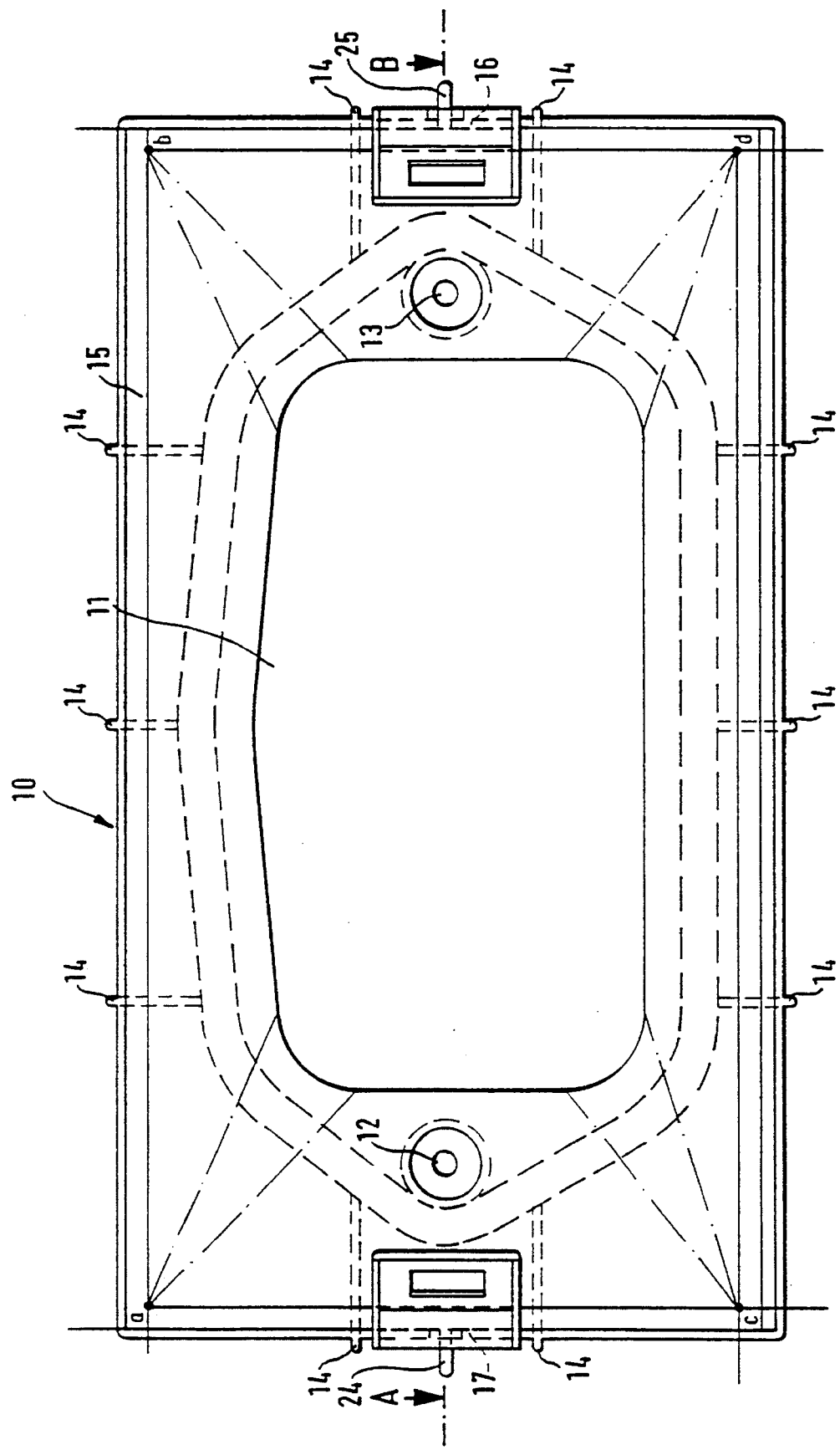
FIG. 1 is a top view of an air filter.

The air filter according to FIG. 1 includes a housing 10. The air filter has a pure-air outlet 11, as well as bores 12, 13 for fastening the housing 10 onto a fresh air duct (not shown in FIG. 1). Several reinforcing ribs 14 are distributed on the circumference of the housing 10. A surrounding sealing layer 15 is situated on the housing 10. Holders 16, 17 are arranged on both narrow sides of the housing 10. In order to provide a better illustration of the housing, the filter element is not shown in FIG. 1.

Figure 2:
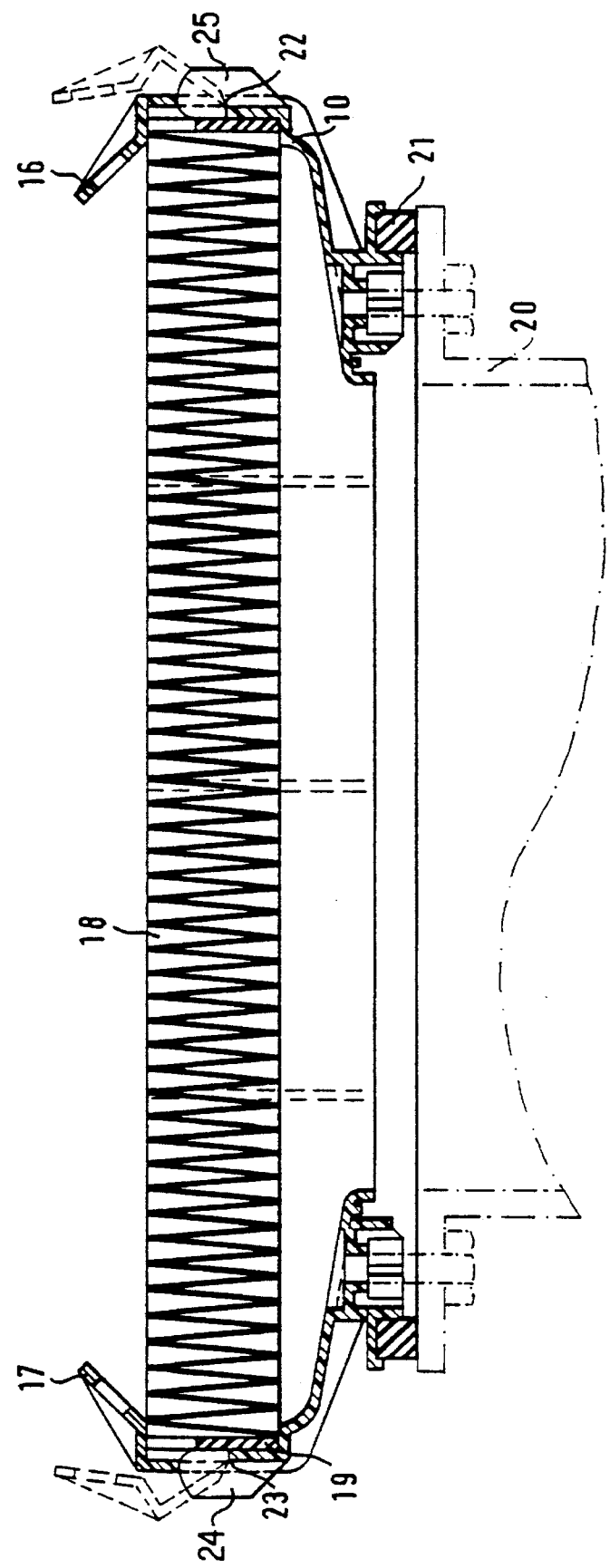
FIG. 2 is a sectional view of the air filter according to FIG. 1, taken along section line A–B.

FIG. 2 is a sectional view taken along intersection line A–B of FIG. 1. The filter element 18 is illustrated in this sectional view. This filter element 18 has a filter medium folded in an accordion-like manner. The filter element 18 is constructed in a flat-shaped manner and includes a surrounding seal 19.

On the face of the housing 10 facing the air duct 20, a surrounding seal 21 is also provided. The holders 16, 17 are fastened to the housing 10 along a fastening line. The holders 16, 17 are connected with the housing 10 by way of a film hinge 22, 23, and can be folded into the position indicated by an interrupted line for the removal of the filter element 18. The filter element 18 can then be removed without any problem and a new filter element can be inserted.

As can be seen in FIG. 1, the housing 10 is provided with two outwardly directed ribs 24 and 25, one of which is arranged at each end of the housing. As more clearly seen in FIG. 2, each of the holders 16, 17 is supported by one of the ribs 24 and 25, and glides along the top edge of the associated rib between the closed position (shown in solid lines) and the opened position (shown in broken lines). The curved upper surfaces of the ribs 24 and 25 will each act as a cam to secure the respective holder 16 in either the opened or closed position.

The complete air filter is very easy to maintain because no cover or similar device impedes the access to the filter element 18. Also, on the unfiltered-air side, the filter element can be evaluated with respect to its degree of contamination by a visual examination. This eliminates the need for high-expenditure indicating devices for evaluating the degree of contamination.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air filter, comprising:

a housing having an air inlet and an air outlet;

a filter element insertable into said housing, said filter element including a filter medium folded in an accordion-like manner, as well as a surrounding seal for sealing off a pure-air area, said air inlet of said housing having a cross-section corresponding with that of said filter element; and holders arranged on said housing via film hinges, said holders operating to fix said filter element in an installed position in said housing, said housing being provided with an outwardly projecting supporting rib associated with each of said holders, said associated ribs comprising curved upper surfaces along which said holders slide between an open position in which said filter element can be removed from the housing and a closed position in which the filter element is fixed in the housing.

2. An air filter according to claim 1, wherein said housing is made of a thermoplastic material and said holders are manufactured in one piece integral with the housing.

3. An air filter according to claim 1, wherein each of said holders have at least one rib which contacts said filter element.

4. An air filter according to claim 2, wherein each of said holders have at least one rib which contacts said filter element.

5. An air filter according to claim 1, wherein said filter element is one of a paper and plastic nonwoven filter element, and said surrounding seal of said filter element is formed of PUR-foam on a polyester base.

6. An air filter according to claim 2, wherein said filter element is one of a paper and plastic nonwoven filter element, and said surrounding seal of said filter element is formed of PUR-foam on a polyester base.

7. An air filter according to claim 3, wherein said filter element is one of a paper and plastic nonwoven filter element, and said surrounding seal of said filter element is formed of PUR-foam on a polyester base.

8. An air filter according to claim 4, wherein said filter element is one of a paper and plastic nonwoven filter element, and said surrounding seal of said filter element is formed of PUR-foam on a polyester base.

9. An air filter according to claim 1, wherein said air filter is installed in an interior of a motor vehicle.

\* \* \* \* \*